(12) United States Patent
Solomon

(10) Patent No.: US 8,690,548 B1
(45) Date of Patent: Apr. 8, 2014

(54) MOBILE HEAT PUMP

(76) Inventor: Fred D. Solomon, Medina, OH (US)

(*) Notice: Subject to any disclaimer, the term of this patent is extended or adjusted under 35 U.S.C. 154(b) by 885 days.

(21) Appl. No.: 12/316,065

(22) Filed: Dec. 9, 2008

(51) Int. Cl.
*F25B 13/00* (2006.01)
*F04B 35/04* (2006.01)

(52) U.S. Cl.
USPC .............. 417/393; 417/538; 62/6; 62/324.6

(58) Field of Classification Search
USPC ............... 417/379, 393, 538; 62/6, 324.6; 137/512.4, 519
See application file for complete search history.

(56) References Cited

U.S. PATENT DOCUMENTS

| | | | | |
|---|---|---|---|---|
| 4,310,017 A | * | 1/1982 | Raines | 137/533 |
| 4,927,335 A | * | 5/1990 | Pensa | 417/393 |
| 4,966,199 A | * | 10/1990 | Ruschke | 137/843 |
| 5,558,506 A | * | 9/1996 | Simmons et al. | 417/393 |
| 6,582,205 B2 | * | 6/2003 | Batten et al. | 417/393 |
| 6,739,139 B1 | * | 5/2004 | Solomon | 62/6 |
| 6,874,997 B2 | * | 4/2005 | Watanabe et al. | 417/395 |

* cited by examiner

*Primary Examiner* — Charles Freay
(74) *Attorney, Agent, or Firm* — Renner, Kenner, Greive, Bobak, Taylor & Weber

(57) ABSTRACT

A heat pump system including a heat engine having a valve assembly positioned to divide the heat engine chamber into a first chamber and a second chamber. A piston is positioned within the heat engine and includes a first piston head in the first chamber, a second piston head in the second chamber, and a connecting rod connecting the first and second piston heads and extending through a bore in the valve assembly. The valve assembly includes a one-way inlet valve and a one-way outlet valve in fluid communication with each of the first and second heat engine chambers. The valve assembly is also in fluid communication with a condenser and evaporator of the heat pump system. The system may also include improved one-way valves, a condensate pump, and a novel shifting valve.

7 Claims, 5 Drawing Sheets

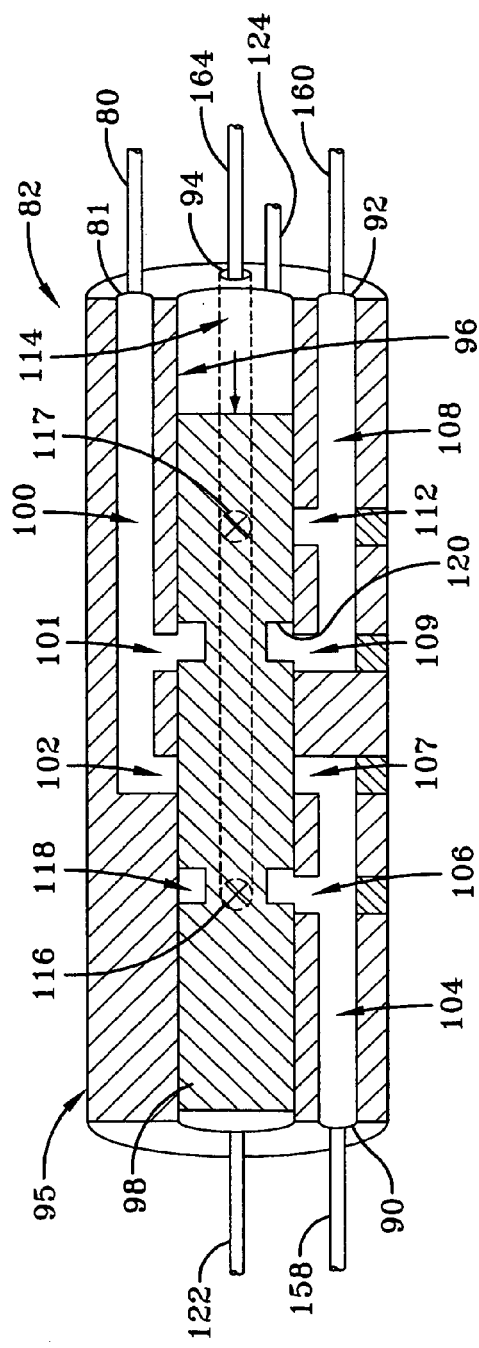
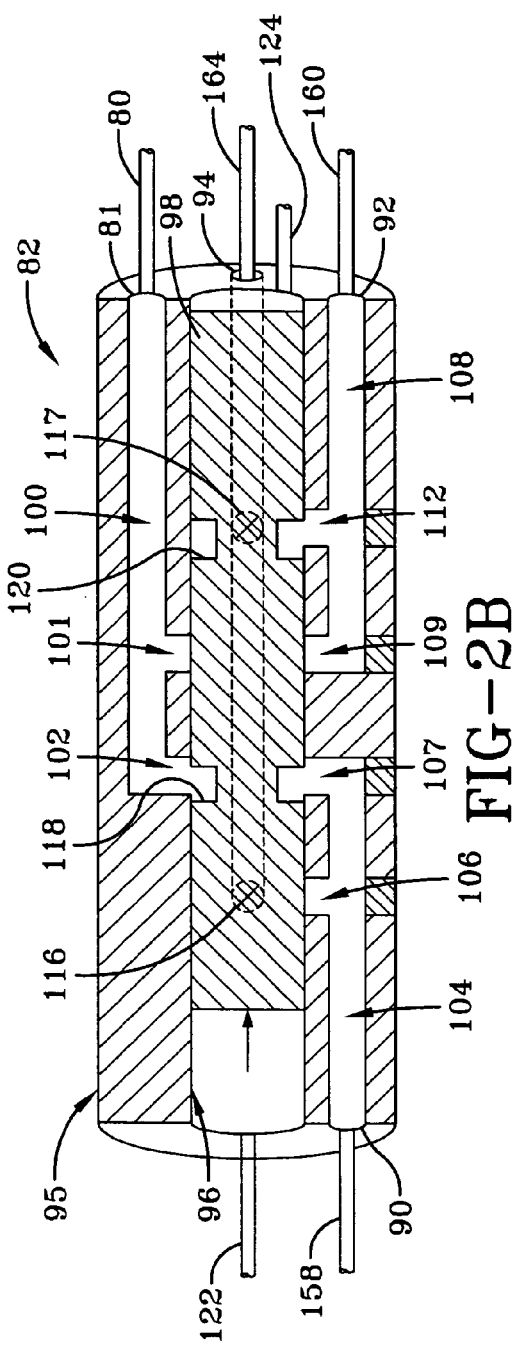
FIG-2A
FIG-2B

MOBILE HEAT PUMP

TECHNICAL FIELD

In general, the present invention relates to a heat pump system configured to provide heating and cooling functions for a vehicle and other applications. More particularly, this invention relates to such a heat pump system that provides heating and cooling by employing a heat engine that is powered by thermal energy and also acts as a compressor to increase the efficiency of the system.

BACKGROUND ART

Heat pumps are well known and extensively used in the heating, ventilation, and air conditioning industries. The most significant advantage to heating and cooling systems employing a heat pump is that they use the same components to effect both heating and cooling operations, as opposed to other systems that require a substantial number of separate equipment components for carrying out both heating and cooling functions. Conventional heat pump systems use a compressor operated by an electric motor to circulate refrigerant through a condenser which converts a gaseous form of the refrigerant to a liquid form of the refrigerant. The liquid refrigerant then passes through an evaporator which either absorbs heat from or imparts heat to an area to be cooled or heated.

Advancements in heat pump system technology have primarily focused on the development of improved working fluids and system components. In the case of working fluids, different refrigerants, and particularly different fluorocarbon compounds, have been developed which have optimum performance characteristics in particular equipment or operating ranges. In regard to the system components, efforts have been made to improve the operation and efficiency of the compressor, condenser, evaporator, and other ancillary components of these systems. However, due to the relatively advanced stage of the technology, only minor improvements in operation and efficiency have been achieved in recent years.

Previous attempts have been made to develop heat driven heat pumps, such as engine driven and absorption type heat pumps. These heat driven heat pumps have not achieved any significant commercial success or acceptance for a variety of reasons. In general, these systems tend to be highly complex and include components that are both sophisticated and expensive. In addition, many of these systems utilize working fluids other than conventional working fluids, such as ammonia or lithium bromide. These alternative working fluids can be potentially hazardous and require new and different procedures and equipment for installation, repair and service.

Heat driven heat pumps employing heat engines and conventional working fluids have been developed but typically suffer from a number of disadvantages. For example, fluid having a high temperature and a high pressure remains in the heat engine cylinder at the end of each power stroke of a conventional heat engine. When this fluid is discharged into a condenser, there is a loss of a significant amount of energy, thereby rendering the system highly inefficient. Another problem in such conventional heat driven heat pumps is the desire to combine the heat engine and compressor within a single housing having a piston rod connecting the heat engine piston with the compressor piston. Since the optimum characteristics for the working fluids in the heat engine and the compressor of these heat pumps are substantially different, it is necessary to employ two different refrigerants. Under these conditions, the higher pressure working fluid eventually migrates through any seals into the lower pressure working fluid, thereby altering the characteristics of the lower pressure working fluid.

Another difficulty in the design of heat engines relates to the valve which effects shifting between the high vapor pressure stroke and exhaust stroke. When a conventional valve shifts, it allows vapor to blast into the cylinder so rapidly that it induces the entire heat pump to vibrate or shake violently, thereby shortening the life of the heat engine. Efforts to slow the valve shift motion have been unsuccessful because the high pressure vapor leaks by the valve when it slowly passes from the high vapor pressure to the exhaust position.

Yet another notorious problem with heat engines is in effecting start-up if the unit has not been running and is cold. When the heat generator or evaporator first begins to deliver hot vapor to the power chamber of the heat engine, it condenses before it can drive the piston. Since there is a limited amount of working fluid, the heat generator can run low on working fluid before the power chamber of the heat engine reaches operating temperature. This causes overheating of the heat generator and possible scorching of the working fluid, thereby requiring major servicing before the heat pump can resume normal operation.

The trucking industry has endeavored for some time to develop an effective and commercially viable system for heating and cooling a truck cab. Of particular concern is the heating and cooling of the sleeper cab for extended periods of time. Conventional practice has been to allow the truck to idle over-night in order to maintain the desired temperature within the cab while the driver sleeps. This approach, while effective, may cause ten or more gallons of diesel fuel to be used by the diesel truck engine in a single night, resulting in an extremely high cost of operation. Increasing regulations on maximum daily driving time in conjunction with increased pressure on drivers to meet tight schedules on long hauls have exasperated the problem. Drivers also face pressures from environmental groups and government agencies to reduce emissions by employing other methods of heating or cooling the truck cabs rather than idling the engine.

Anti-idling alternatives have thus far proven ineffective for various reasons, including undesired increases in the weight of the truck resulting in reduced fuel efficiency, system complexity, and system requirements resulting in time limits on system operation. In addition, current anti-idling technologies require that conventional heating and cooling systems be employed during operation of the truck, resulting in unnecessary energy consumption to maintain the truck cab at a desired temperature while the truck is running.

Thus, the need exists for a heat pump system solving one or more of the disadvantages or limitations discussed above. In particular, there is a need for a mobile heat driven heat pump system that may be employed as an anti-idling technology, in addition to other heating and cooling applications.

DISCLOSURE OF THE INVENTION

It is thus an object of one aspect of the present invention to provide a heat pump system which may be exclusively heat driven, wherein the working fluid in a power section is vaporized in a heat generator by thermal energy from a hot water source.

It is an object of another aspect of the present invention to provide a heat pump system, as above, wherein the heat engine of the power section and the compressor of the condenser section constitute a combined or consolidated unit.

It is an object of an additional aspect of the present invention to provide a heat pump system, as above, having a valve assembly within the heat engine to divide a heat engine chamber therein into first and second compressor chambers, and to control the flow of a compressor working fluid into and out of the heat engine.

It is an object of a further aspect of the present invention to provide a heat pump system, as above, which solves cold startup problems normally encountered when the system has not been running and the heat engine is at ambient temperature.

It is an object of yet another aspect of the present invention to provide a heat pump system, as above, having a shifting valve which controls the flow of power section working fluid vapor into the heat engine to power a piston therein, and which also controls the flow of the power section working fluid vapor exhausting from the heat engine.

It is an object of a still further aspect of the present invention to provide a heat pump system, as above, having an improved condensate pump to increase the efficiency of the system.

It is an object of a further aspect of the present invention to provide a heat pump system, as above that incorporates alternate energy assistance to create heat energy, such as solar panels.

It is an object of another aspect of the present invention to provide an improved one-way valve for use in the valve assembly of the heat engine and the condensate pump.

These and other objects of the present invention, as well as the advantages thereof over existing prior art forms, which will become apparent from the description to follow, are accomplished by the improvements hereinafter described and claimed.

In general, a heat pump system according to one or more objects of the present invention includes a heat engine having a body defining a heat engine chamber and a compressor working fluid network communicating with the chamber of the heat engine. The system also includes a valve assembly including a valve assembly body, a bore through the valve assembly body, and a piston disposed within the heat engine chamber having a piston rod slidably received in the bore. The valve assembly and the piston rod act to divide the heat engine chamber into two separate chambers, with the valve assembly including a one-way inlet valve and a one-way outlet valve in fluid communication with each of the chambers and with the compressor working fluid network.

In accordance with another aspect of the present invention, a heat pump system includes a heat engine having a first chamber with a power side and a second chamber with a power side. The system also includes a power working fluid vapor source, and a shifting valve. The shifting valve has a valve body with an inlet passageway in fluid communication with the power working fluid vapor source, an internal bore, and a shifting block disposed within the bore. The shifting block is provided with first and second annular recesses, and is selectively movable from a first position to a second position to control the flow of the power working fluid vapor therethrough.

In accordance with an additional aspect of the present invention, a heat pump system includes a condensate pump having a pump housing and two cavities within the housing. A first piston is slidably received in the first cavity and a second piston is slidably received in the second cavity. A rotating drive shaft and a bearing mounted eccentrically on said rotating drive shaft are also provided, the drive shaft extending generally perpendicular to the pistons. The pistons are biased to remain in contact with the bearing, so that reciprocating motion of the pistons within the cavities creates a pumping effect.

In accordance with yet another aspect of the present invention, a heat pump system includes a valve assembly with a plurality of one-way valves. The one-way valves include an inlet side with a plurality of apertures, an outlet side with a bore therethrough, and an inner cavity defined by the inlet side and the outlet side. The one-way valves also include at least one projection extending into the inner cavity adjacent to the bore, and a floating disc. The floating disc is prevented from sealing against the bore by the at least one projection, thereby allowing flow in one direction.

A preferred exemplary heat pump system according to the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 2A is a sectional view of a shifting valve according to one or more aspects of the present invention showing the shifting block in a first position.

FIG. 2B is a sectional view of the shifting valve of FIG. 2A showing the shifting block in a second position.

PREFERRED EMBODIMENTS FOR CARRYING OUT THE INVENTION

Figure 1:
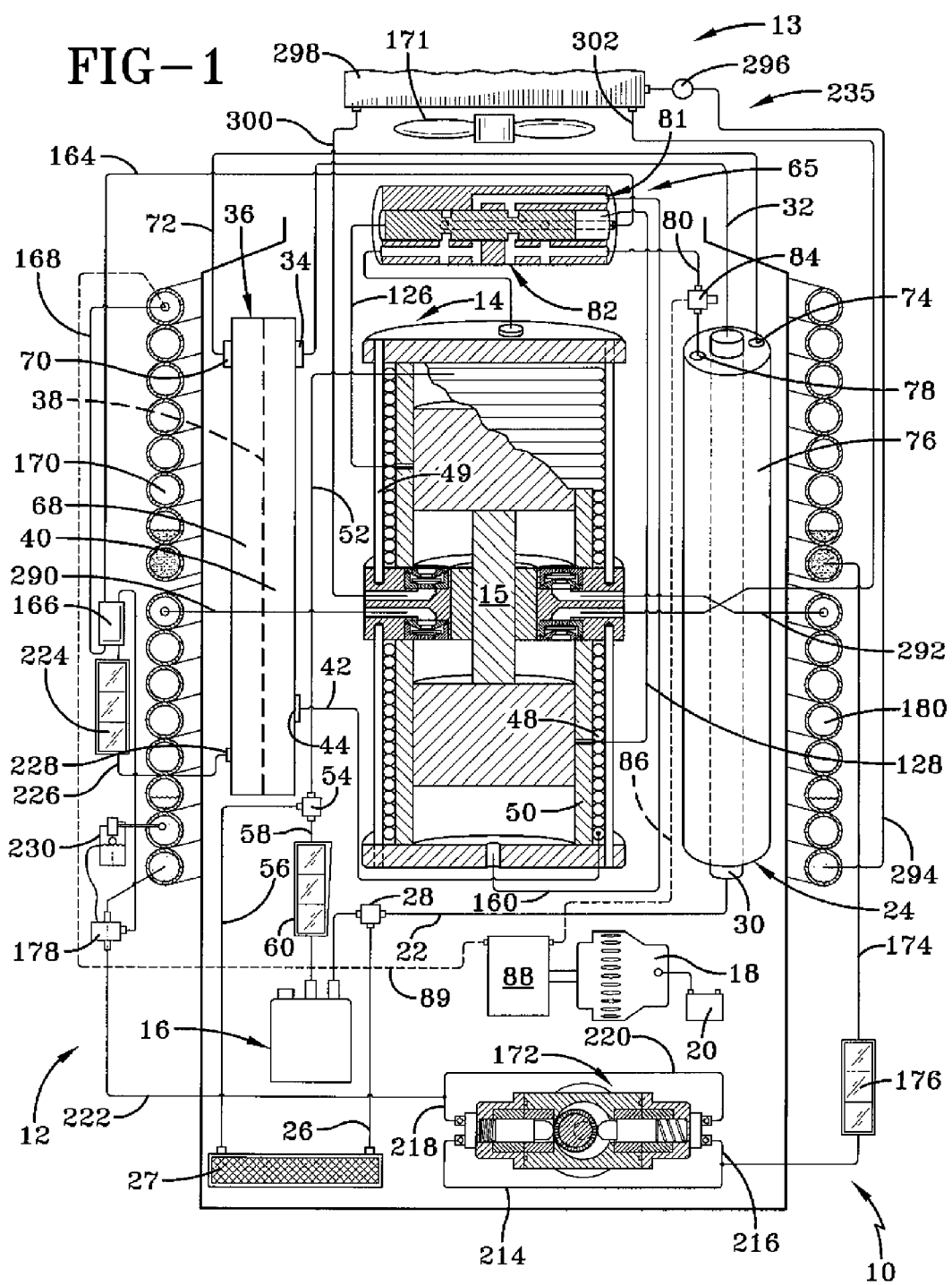
FIG. 1 is a schematic depiction of a heat pump system according to one or more aspects of the present invention.

A heat pump system in accordance with the present invention is shown in FIG. 1 of the drawings and is indicated generally by the numeral 10. While the exemplary heat pump system 10 shown and described herein is particularly applicable as a unit which may be employed on a truck, larger or smaller units may be employed depending upon the heating and cooling requirements, and the invention may be readily adapted to other applications, particularly in instances where excess heat may be available.

Heat pump system 10 includes a power section, generally indicated by the numeral 12, which drives and is operatively engaged with a compressor section, generally indicated by the numeral 13. The power section 12 includes a hot water heat source, generally indicated by the numeral 16, that heats water to be used to power heat pump system 10. Power section 12 powers a heat engine 14 causing reciprocating motion of a piston 15 therein. The motion of the piston 15 within heat engine 14 also provides a compressing function useful in compressor section 13, as will be described in detail herein. Compressor section 13 includes a condenser 180 and an evaporator 298 in a conventional and well known configuration to generate a cooling effect on airflow passing through the evaporator. Heat pump system 10 may also include a vapor powered motor 88 and an alternator 18 used to charge a battery 20 for powering electronic components of the system, such as fan 171 in order to further reduce the energy needed to operate the system.

While the arrangement shown in FIG. 1 contemplates use of a conventional diesel burning heater as the heat source 16, it is to be appreciated that other heat sources could be employed, depending upon fuel availability and other considerations. Water within heat source 16 is heated to a desired temperature by heat source 16 and then directed through a hot water line 22 to a vapor storage tank 24. The water is preferably heated to a temperature of between approximately 175° F. and 225° F. in order to provide enough thermal energy to power heat pump system 10.

Although heat source 16 is capable of providing sufficient thermal energy to power the power section 12 of heat pump system 10, the configuration of FIG. 1 contemplates the presence of an additional and alternative source of heated water. A second hot water line 26 may be utilized to supply hot water that has been used to cool the engine of a truck or other vehicle, generally indicated by the numeral 27. The heated water from truck engine 27 is only available to power heat pump system 10 when the truck engine 27 is running, and therefore does not remove the necessity for heat source 16 if heat pump system 10 is to ever be operated when the truck is turned off. Heated water from truck engine 27 will typically be within the ideal temperature range discussed above so as to provide sufficient thermal energy.

In the arrangement of power section 12 shown in FIG. 1 a solenoid valve 28 is provided in hot water line 22 to control the source of hot water, the solenoid valve 28 also communicating with hot water line 26. When the truck engine is turned off, solenoid valve 28 is configured to draw hot water from heat source 16. When the truck engine is running, solenoid valve 28 is switched to draw hot water from truck engine 27, and heat source 16 can be turned off. Use of hot water from truck engine 27 allows heat pump system 10 to be powered solely by energy from truck engine 27 that is otherwise wasted, without drawing energy from any other source and while also providing a cooling function for the cooling system of the truck engine. Such a configuration could easily be adapted to be used on any mobile vehicle using a liquid cooling system, as will be appreciated by those skilled in the art.

The hot water from hot water line 22 travels through a central tube 30 within storage tank 24, thereby acting to maintain the elevated temperature of a working fluid vapor located around central tube 30 and within storage tank 24, as will be discussed in greater detail below. After passing through central tube 30 of storage tank 24, the hot water travels through a hot water line 32 to a high temperature water inlet 34 of a heat generator 36. Heat generator 36 is provided with a flat plate 38 which divides the interior of heat generator 36 and creates two distinct and separate chambers therein. A first chamber 40 within heat generator 36 is a hot water chamber, and is in fluid communication with hot water line 32 at high temperature water inlet 34. A second chamber 68 is located opposite first chamber 40 and separated therefrom by flat plate 38, as will be discussed in greater detail below. First chamber 40 is in fluid communication with a low temperature water line 42 at a low temperature water outlet 44. Flat plate 38 is made of a highly conductive material, such as ceramic so as to facilitate heat transfer therethrough. Latent heat from the hot water is absorbed by working fluid liquid on the opposite side of flat plate 38, thereby reducing the temperature of the water as it passes through heat generator 36.

Low temperature water leaves heat generator 36 through low temperature water line 42 at low temperature water outlet 44 and is directed to a body heating coil 48 around heat engine 14. Although referred to as low temperature water, it should be appreciated that the water leaving heat generator 36 retains some amount of latent heat, and is referred to as low temperature water due to its decreased temperature relative to the high temperature water supplied through hot water line 22. The low temperature water transfers its remaining latent heat to the body 50 of heat engine 14 as it travels through body heating coil 48 around heat engine 14, thereby warming body 50 as well as the internal parts and cavities of heat engine 14. Heating coil 48 is instrumental in overcoming the cold start problems which normally plaque thermal heat pumps. Before the heat engine 14 and compressor section 13 are switched to an operating state, the heat generator 16, or truck engine 27, is actuated to produce hot water which travels through body heating coil 48 and transfers heat to heat engine 14. The heat is conducted through body 50 of heat engine 14 to the inner components and cavities therein, including piston 15, to elevate the temperatures of these components to an efficient working temperature. A plurality of rods 49 may be circumferentially spaced around heating coil 48 to provide protection and to add support and strength to heat engine 14.

The now cooled water exits body heating coil 48 and travels through water return line 52 where it is directed to a solenoid valve 54 that controls the subsequent path of the cooled water. The temperature of the water has been further reduced relative to its temperature upon entering body heating coil 48 as a result of its having transferred latent heat to heat engine 14. Solenoid valve 54 either directs the cooled water back to heat generator 16 or back to truck engine 27, depending upon the source of hot water to storage tank 24. If solenoid valve 28 is positioned to draw water from truck engine 27, then solenoid valve 54 in water return line 52 is positioned to return cooled water to truck engine 27 through truck return line 56. Conversely, if solenoid valve 28 in hot water line 22 is positioned to draw hot water from heat generator 16, then solenoid valve 54 is positioned to return cooled water to heat generator 16 through heat generator return line 58. In either case, the low temperature water is reheated before subsequently being cycled through power section 12 again. As is apparent from the above description, the water being utilized in power section 12 of heat pump system 10 serves a dual function when truck engine 27 is running, acting simultaneously to both provide power to heat pump system 10 and cool truck engine 17. Such an arrangement thereby substantially decreases the energy consumption of the heat pump system 10 as compared to conventional heat pump systems.

A solar panel 60 may optionally be provided in heat generator return line 58 to preheat the cooled water prior to reintroducing it to heat generator 16. The solar panel 60 may be positioned on the roof of the truck cab or in any other location where it would be most effective. Thus, when truck engine 27 is off and heat generator 16 is utilized to power the heat pump system 10, solar panel 60 may further reduce the load placed upon heat generator 16 by increasing the temperature of the water to be heated. Consequently, by providing solar panel 60 in heat generator return line 58, heat generator 16 will require significantly less diesel fuel to heat the water, further reducing the cost to operate heat pump system 10.

Heat engine 14 is integral with and is powered by a power working fluid network, generally indicated by the numeral 65, which functions as a component of power section 12, and which will now be described in detail along with the various components that make up the network. Power working fluid network 65 includes a working fluid therein which undergoes pressure and temperature changes as it moves through the system, as is well known in the art. A preferred working fluid to achieve maximum efficiency in power section 12 is a refrigerant that requires a very low threshold of latent heat stored therein to cause boiling. A particularly suitable product is HFC-72, which provides a 40% increase in efficiency over the conventional R113 refrigerant, which might also be used in the working fluid network. It should also be appreciated that other fluoro-chloro hydrocarbon compounds or other refrigerants with similar characteristics could be employed in the present invention.

The working fluid circulates through the system and, as such, passes through a second chamber 68 of heat generator 36 and is separated from the hot water within first chamber 40 by flat plate 38. Latent heat from the hot water within first chamber 40 is absorbed through flat plate 38 by the working fluid as discussed above. Due to its low boiling point, the working fluid is converted into a vapor by the heat absorbed from first chamber 40 while the hot water therein remains in liquid form. The heated working fluid vapor exits second chamber 68 of heat generator 36 through a vapor outlet 70 in fluid communication with working fluid vapor outlet line 72. The heated working fluid vapor is directed through vapor outlet line 72 to an inlet port 74 in a vapor storage area 76 of vapor storage tank 24. Vapor storage area 76 is annular in shape and surrounds central tube 30, which contains hot water. The heat from the hot water within central tube 30 ensures that the working fluid vapor will remain at a sufficiently elevated temperature and pressure so as to remain a vapor and prevent it from condensing into liquid form. Vapor storage area 76 also acts as a working fluid vapor reservoir to prevent fluctuations in vapor pressure throughout the rest of power working fluid network 65.

Working fluid vapor exits vapor storage area 76 at a working fluid vapor outlet port 78 and travels through a high pressure vapor line 80 to a high pressure vapor inlet port 81 on a shifting valve 82. A solenoid valve 84 is provided in high pressure vapor line 80 to control the operation of heat engine 14. In a first position, solenoid valve 84 is closed and does not permit high pressure vapor to be removed from vapor storage area 76. Solenoid valve 84 may be in the first closed position when heat pump system 10 is inactive, or when heat engine 14 is not needed because a cooling effect is not necessary or desired at a given time. In a second position, solenoid valve 84 is configured to allow high pressure vapor to flow from vapor storage area 76 through high pressure vapor line 80 and into shifting valve 82. Shifting valve 82 controls and directs the high pressure vapor as it passes therethrough when solenoid valve 84 is positioned so as to direct the high pressure vapor into shifting valve 82.

A third position of solenoid valve 84 may optionally be provided to allow high pressure vapor from vapor storage area 76 to be directed through a high pressure vapor alternator line 86 extending from solenoid valve 84 to drive an alternator motor 88 operatively engaged with alternator 18. The high pressure vapor may be used to power the motor 88 which drives the alternator 18, thereby charging a battery 20, as is well known to those skilled in the art. Although the arrangement shown contemplates use of a vane motor 88 to power alternator 18, it should be appreciated that other vapor or gas driven engines known to those skilled in the art may be employed. High pressure vapor exiting vane motor 88 travels through a vapor alternator return line 89 to condenser 170.

Shifting valve 82, as best seen in FIGS. 2A and 2B, includes high pressure vapor inlet port 81, a first dual-flow port 90, a second dual-flow port 92, and an exhaust port 94. Each of these ports is positioned on one of the ends of a shifting valve body 95 that is generally cylindrical in shape and includes a bore 96 therein that is closed at both ends. A generally cylindrical shifting block 98 is slidingly positioned within cylindrical bore 96. Shifting block 98 has an axial length less than the axial length of bore 96 and is adapted to be moved axially therein from a first position shown in FIG. 2A to a second position shown in FIG. 2B, and vice versa. Although a cylindrical shifting valve body 95, a cylindrical bore 96, and shifting block 98 are described herein and shown in the drawings, it will be appreciated by those skilled in the art that the shape of these components is not critical to the operation and function of shifting valve 82 and may be varied without deviating from the scope of the present invention.

An axially extending inlet passageway 100 is provided in valve body 95 and is in fluid communication with a high pressure vapor inlet port 81. Inlet passageway 100 extends only partially through valve body 95 in the axial direction and includes a first inlet connecting channel 101 and terminates in a second inlet connecting channel 102, each oriented radially and opening into bore 96.

An axially extending top dual-flow passageway 104 is provided through valve body 95 and is in fluid communication with first dual-flow port 90. Top dual-flow passageway 104 includes a first exhaust connecting channel 106 and a first high pressure vapor connecting channel 107, each oriented radially and opening into bore 96. An axially extending bottom dual-flow passageway 108 is provided through valve body 95 and is in fluid communication with second dual flow port 92. Bottom dual-flow passageway 108 is generally coaxial with and is located axially opposite top dual-flow passageway 104 within valve body 95. Bottom dual flow passageway includes a second high pressure vapor connecting channel 109, and a second exhaust connecting channel 112, each extending radially from bottom dual flow passageway 108 and opening into bore 96.

Valve body 95 also includes an axially extending exhaust passageway 114 that is in fluid communication with exhaust port 94. Exhaust passageway 114 includes a first exhaust outlet connecting channel 116 and terminates in a second exhaust outlet connecting channel 117, each oriented radially and connecting exhaust passageway 114 to bore 96.

As can be seen in FIGS. 2A and 2B, each of the channels within valve body 95 is axially aligned with one other channel. That is, first exhaust connecting channel 106 and first exhaust outlet connecting channel 116 are axially aligned, first high pressure vapor connecting channel 107 and second inlet connecting channel 102 are axially aligned, second high pressure vapor connecting channel 109 and first inlet connecting channel 101 are axially aligned, and second exhaust connecting channel 112 and second exhaust outlet connecting channel 117 are axially aligned.

Shifting block 98 includes a first annular recess 118 and a second annular recess 120 therein. When shifting block 98 is in the position depicted in FIG. 2A, first annular recess 118 connects first exhaust connecting channel 106 and first exhaust outlet connecting channel 116 so that exhaust vapor flowing in through first dual-flow port 90 is directed through shifting valve 82 and out exhaust port 94. In this same position, second annular recess 120 connects second high pressure vapor connecting channel 109 and first inlet connecting channel 101 to allow high pressure vapor flowing in through high pressure vapor inlet port 81 to pass through shifting valve 82 and out second dual-flow port 92.

When shifting block 98 is shifted to the position depicted in FIG. 2B, first annular recess 118 connects first high pressure vapor connecting channel 107 with second inlet connecting channel 102 to allow high pressure vapor flowing in through high pressure vapor inlet port 81 to pass through shifting valve 82 and out first dual-flow port 90. When in this same position, second annular recess 120 connects second exhaust connecting channel 112 and second exhaust outlet connecting channel 117 so that exhaust vapor flowing in through second dual-flow port 92 is directed through shifting valve 82 and out exhaust port 94. Thus, in both positions of shifting block 98, high pressure vapor enters high pressure vapor inlet port 81 and exhaust vapor exits through exhaust port 94. However, the position of shifting block 98 alters whether high pressure vapor is flowing out or exhaust vapor is flowing in through each of the dual-flow ports 90 and 92.

Figure 3:
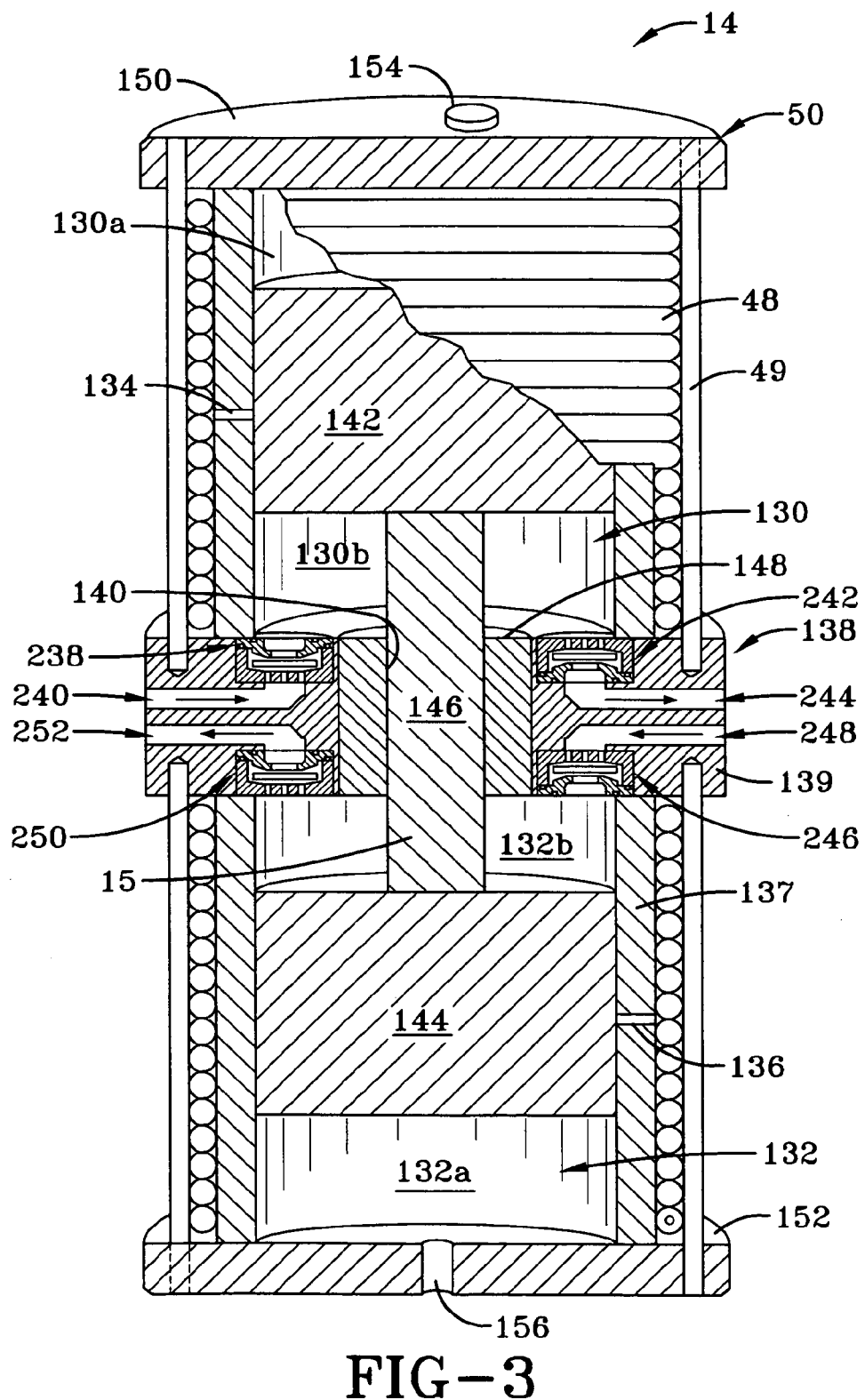
FIG. 3 is an enlarged sectional view of the heat engine of FIG. 1 showing the piston in a mid-stroke position.

The position of shifting block 98 is controlled by shifting ports 122 and 124 located centrally on either end of shifting valve 82 which open into bore 96. Shifting lines 126 and 128 (FIG. 1) are in fluid communication with shifting ports 122 and 124 respectively, while also communicating with an upper piston chamber 130 and a lower piston chamber 132 of heat engine 14 (FIG. 3). Shifting line 126 connects shifting port 122 to upper piston chamber 130 via an upper opening 134, and shifting line 128 connects shifting port 124 to lower piston chamber 132 via a lower opening 136. Upper opening 134 and lower opening 136 are each positioned so as to be exposed at the extreme end of both the up-stroke and down-stroke of piston 15.

At the end of a downward stroke of piston 15, pressure within upper piston chamber 130 is greater than that within lower piston chamber 132. The unbalanced pressure causes the higher pressure vapor to travel through shifting line 126 and shifting port 122 into shifting valve 82, thereby causing shifting block 98 to shift right to the second position shown in FIG. 2B, hereinafter referred to as the up-stroke position. Conversely, at the end of an upward stroke of piston 15, pressure within lower piston chamber 132 is greater than the pressure within upper piston chamber 130. This unbalanced pressure causes the higher pressure vapor to travel through shifting line 128 and shifting port 124 into shifting valve 82, thereby causing shifting block 98 to shift left to the first position shown in FIG. 2A, hereinafter referred to as the down-stroke position. In each case, the shifting of shifting block 98 causes piston 15 to reverse its direction of travel, thereby covering upper opening 134 and lower opening 136 again until the completion of that stroke. It will be appreciated by those skilled in the art that while a particular configuration designed to cause axial movement of shifting block 98 is described herein and depicted in the drawings, other methods may be employed to create such axial movement of shifting block 98, and the invention should not limited to the configuration disclosed.

With reference now to FIG. 3, body 50 of heat engine 14 is generally cylindrical in shape and includes a cylindrical sidewall 137 and a valve assembly 138 having a housing 139 at approximately the longitudinal center of body 50. The valve assembly includes a bore 140 therethrough. Valve assembly 138 effectively divides the inner chamber within body 50 into upper piston chamber 130 and lower piston chamber 132, and controls the flow of a working fluid of compressor section 13 as will be discussed in detail below. Piston 15 includes an upper piston head 142 positioned in upper piston chamber 130, a lower piston head 144 positioned in lower piston chamber 132, and a piston rod 146 connecting upper piston head 142 to lower piston head 144. Piston rod 146 is slidably received within bore 140 through housing 139 of valve assembly 138, and is sized so as to fit snugly therein to substantially seal upper piston chamber 130 from lower piston chamber 132. While efforts are made to provide a fluid-tight seal at bore 140 and piston rod 146 by sizing each to have small tolerances, it is acknowledged that a completely effective seal is unlikely due to the extreme pressure differences generated within heat engine 14.

Body 50 also includes an upper cap 150 and a lower cap 152 to enclose upper piston chamber 130 and lower piston chamber 132 respectively. An upper two-way port 154 is provided in upper cap 150 and a lower two-way port 156 is provided in lower cap 152. Upper two-way port 154 is in fluid communication with upper piston chamber 130, and also with first dual-flow port 90 through an upper dual-flow line 158 (FIGS. 2A and 2B). Lower two-way port 156 is in fluid communication with lower piston chamber 132, and also with second dual-flow port 92 through a lower dual-flow line 160 (FIGS. 2A and 2B).

Body 50 of heat engine 14, as well as housing 139 of valve assembly 138 and piston 15, are preferably constructed of a ceramic material such as alumina silicate or another material having a smooth surface and a capability of conducting heat. The smooth surface provided by ceramic materials permits piston heads 142 and 144 to be sized to fit snugly within upper piston chamber 130 and lower piston chamber 132 respectively while still maintaining the ability to slide axially therein. This significantly reduces the amount of leakage of the working fluid from around the piston heads during operation of heat engine 14. The conductivity of ceramic materials also acts to increase the efficiency of the system.

Referring now to FIGS. 1-3, when solenoid valve 84 is positioned to direct high pressure vapor to high pressure vapor inlet port 81, and shifting valve 82 is in the upstroke position as shown in FIG. 2A, the high pressure vapor is directed out of shifting valve 82 through second dual-flow port 92. The high pressure vapor then travels through lower dual-flow line 160 and lower two-way port 156 into a power side 132a of lower piston chamber 132 on the outside of piston head 144. As the high pressure vapor fills power side 132a of lower piston chamber 132 the pressure therein increases and piston 15 is forced to move axially upward. As piston 15 moves upward, a power side 130a of upper piston chamber 130 is compressed, thereby forcing exhaust vapor out through upper two-way port 154 and upper dual-flow line 158. The exhaust vapor flows from upper dual-flow line 158 through first dual-flow port 90 and is directed through shifting valve 82 and out exhaust port 94, as discussed in detail above. When piston 15 reaches the end of its up-stroke, openings 134 and 136 are both uncovered from piston heads 142 and 144 respectively, thereby allowing the higher pressure vapor in lower piston chamber 132 to cause shifting valve 82 to shift to its down-stroke position, as shown in FIG. 2A and as discussed above.

The high pressure vapor is now directed out of shifting valve 82 through first dual-flow port 90, through upper dual-flow line 158 and upper two-way port 154. The high pressure vapor enters the power side 130a of upper piston chamber 130 on the outside of piston head 142. Similar to the up-stroke discussed above, as the high pressure vapor fills power side 130a of upper piston chamber 130 the pressure therein increases and piston 15 is forced to move axially downward. As piston 15 moves downward, the power side 132a of lower piston chamber 132 is compressed, thereby forcing exhaust vapor out through lower two-way port 156 and lower dual-flow line 160. The exhaust vapor flows from lower dual-flow line 160 through second dual-flow port 92 and is directed through shifting valve 82 and out exhaust port 94. When piston 15 reaches the end of its down-stroke, openings 134 and 136 are again uncovered from piston heads 142 and 144 respectively, thereby allowing the higher pressure vapor in upper piston chamber 132 to cause shifting valve 82 to shift to its up-stroke position, as shown in FIG. 2B and as discussed above. In this way, shifting valve 82 effects a continuous reciprocating motion of piston 15 during operation of heat engine 14.

Referring back to FIG. 1, the working fluid exhaust vapor exiting from exhaust port 94 of shifting valve 82, whether from upper piston chamber 130 or lower piston chamber 132, is directed through exhaust line 164 and into recuperative unit 166 where the exhaust vapor transfers much of its remaining latent heat to cooled working fluid from the condensate pump, as will be discussed below. After traveling through recuperative unit 166, the working fluid exhaust vapor is sent through condenser input line 168 and into condenser 170. The exhaust vapor is cooled as it travels through condenser 170 and as it loses heat it condenses back into liquid form. The cooling effect of condenser 170 may be increased by providing a fan 171 that forces ambient air across the condenser 170. As the working fluid exhaust vapor transforms into working fluid liquid, it flows to the bottom of condenser 170 by virtue of gravitational forces acting upon the liquid, which now has an increased density as compared to the exhaust vapor entering the condenser. A condensate pump 172 draws the liquid from condenser 170 into condenser liquid outlet line 174, which may pass through an optional solar panel 176 to begin to reheat the working fluid liquid. Condensate pump 172 draws the working fluid liquid from condenser 170 and pumps it to solenoid valve 178, which may direct the liquid back to recuperative unit 166, or into compressor condenser 180 depending upon operating conditions to be discussed hereinafter.

Figures 4A, 4B:
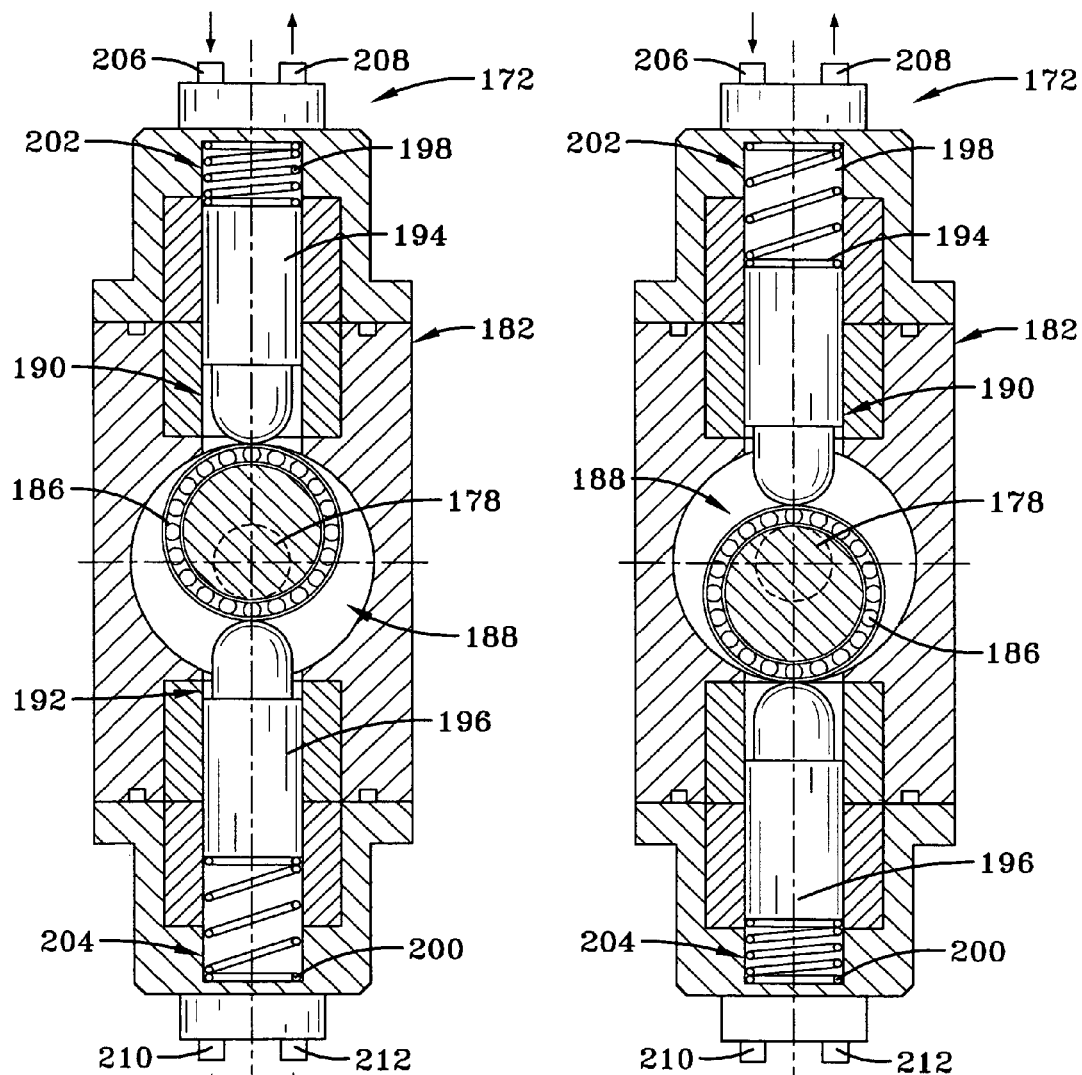
FIG. 4A is a sectional view of a condensate pump according to one or more aspects of the present invention showing a first pump chamber in a compressed state.
FIG. 4B is a sectional view of the condensate pump of FIG. 4A showing a second pump chamber in a compressed state.

Various known and conventional condensate pumps may be employed in the present invention, including the diaphragm pump design described in U.S. Pat. No. 5,129,236, or the piston-driven condensate pump described in U.S. Pat. No. 6,739,139, both of which are incorporated herein by reference for the purpose of teaching these condensate pump designs. Alternatively, the condensate pump 172 can also be an eccentric-bearing driven condensate pump, as shown in FIGS. 4A and 4B.

Condensate pump 172 is driven by an electric motor (not shown) having a rotating shaft. The motor is powered by battery 20, thereby requiring no exterior power source outside of heat pump system 10. Condensate pump 172 includes a drive shaft 178 driven by the rotating shaft of the motor by a gear arrangement rotationally interconnecting the shafts, as is well known in the art. Drive shaft 178 of condensate pump 172 is received in a housing 182 and is rotationally positioned within one or more bearings (not shown) to secure it therein while allowing free rotation thereof. A bearing 186 is mounted eccentrically on drive shaft 178 within an inner chamber 188 of housing 182. A first cylindrical cavity 190 extends in a first radial direction from drive shaft 178 in housing 182, and a second cylindrical cavity 192 extends in a second radial direction from drive shaft 178. A first piston 194 is provided in first cylindrical cavity 190 and a second piston 196 is provided in second cylindrical cavity 192. Each of the pistons 194, 196 is biased toward drive shaft 178 by a spring 198, 200, respectively, thereby causing each piston to maintain contact with eccentric bearing 186 at all times. Housing 182 and first and second pistons 194, 196 may be made of a ceramic material to improve the efficiency of condensate pump 172.

A first pump chamber 202 is defined by first cylindrical cavity 190 and first piston 194, and a second pump chamber 204 is defined by second cylindrical cavity 192 and second piston 196. First pump chamber 202 is in fluid communication with a first one-way inlet valve 206, and a first one-way outlet valve 208 positioned in housing 182, and second pump chamber 204 is in fluid communication with a second one-way inlet valve 210 and a second one-way outlet valve 212. As will be appreciated, rotation of drive shaft 178 and eccentric bearing 186 causes reciprocating motion of first and second pistons 194 and 196. The reciprocating motion of the first piston 194 and second piston 196 provides the pumping action of condensate pump 172 by increasing and decreasing the size of pumping chambers 202 and 204.

As shown in FIG. 1, condenser liquid outlet line 174 is split upstream of condensate pump 172 to provide a first pump inlet line 214 and a second pump inlet line 216 in communication with first one-way inlet valve 206 and second one-way inlet valve 210, respectively. When the volume of either pump chamber 202, 204 is increased, working fluid liquid is drawn into the chamber through inlet valves 206 and 210 from inlet lines 214 and 216. When the size of either pump chamber 202, 204 is decreased by reciprocating movement of the pistons 194 and 196, working fluid liquid is forced out through outlet valves 208 and 212 into a first pump outlet line 218 and a second pump outlet line 220, respectively. One-way valves 206, 208, 210, and 212 may be provided as any known one-way valve, including the one-way valve described hereinafter as provided in valve assembly 138 (FIG. 3). First pump outlet line 218 and second pump outlet line 220 merge to create working fluid condensed liquid line 222.

Under normal operating conditions the condensed working fluid liquid travels through condensed liquid line 222 and through solenoid valve 178 to recuperative unit 166 where it absorbs latent heat from working fluid exhaust vapors exiting shifting valve 82. After passing through recuperative unit 166, the condensed liquid may optionally pass through a solar panel 224 to increase the temperature thereof prior to traveling through working fluid liquid inlet line 226 and being reintroduced to second chamber 68 of heat generator 36 through working fluid liquid inlet 228. Here, the working fluid liquid is reheated by the hot water within first chamber 40 through flat plate 38 and is converted back into a vapor before being cycled through power working fluid network 65 again.

Solenoid valve 178 is configured to direct the condensed liquid to recuperative unit 166 under normal operating conditions. However, when required by operating conditions within the system, solenoid valve may be configured to direct the condensed working fluid liquid into a condenser 180 of compressor section 13 rather than to recuperative unit 166. Compressor condenser 180 is separate and distinct from condenser 170 of power section 12, and is not in fluid communication therewith. Solenoid valve 178 is operatively connected to a conventional float valve 230, which measures the level of fluid within condenser 180. Fluid from compressor section 13 which includes condenser 180, tends to migrate into the working fluid network 65 of power section 12 due to pressure differences in the heat engine 14. Over time this could result in an undesired imbalance of fluid levels between the two fluid networks, with the power section 12 having an over abundance of working fluid and compressor section 13 having insufficient working fluid. Thus, when fluid levels in condenser 180 reach a low threshold level, float valve 230 causes solenoid valve 178 to direct working fluid liquid into condenser 180 until a balance has been restored, at which time solenoid valve 178 redirects the working fluid liquid back to recuperative unit 166.

As previously described, compressor section 13 also includes a working fluid which undergoes pressure and temperature changes as it moves through a compressor working fluid network, generally indicated by the numeral 235. The compressor section working fluid is preferably the same as the working fluid of power section 12, previously described.

Thus, the working fluid of compressor section 13 is preferably a fluoro-chloro hydrocarbon compound or other refrigerant having a low boiling point. Utilization of a common working fluid in both power section 12 and compressor section 13 of heat pump system 10 eliminates problems present in the prior art as a result of leakage and the mixing of different working fluids. The use of a common working fluid is permitted due to the otherwise increased efficiency of the system.

Valve assembly 138 within heat engine 14 is in fluid communication with both a compressor side 130b of upper piston chamber 130 on the interior side of upper piston head 142, and with a compressor side 132b of lower piston chamber 132 on the interior side of lower piston head 144 (FIG. 3). The housing 139 of valve assembly 138 has at least two one-way valves therein that are in fluid communication with compressor side 130b of upper piston chamber 130. Housing 139 also includes at least two one-way valves that are in fluid communication with compressor side 132b of lower piston chamber 132. Each compressor side 130b and 132b is in fluid communication with at least one one-way inlet valve and at least one one-way outlet valve to control the flow of the compressor working fluid into and out of compressor sides 130b and 132b. Each one-way valve is also in fluid communication with either an inlet or outlet passageway for the compressor working fluid vapor.

An upper inlet valve 238 is in fluid communication with an upper inlet passageway 240. The upper inlet valve 238 is configured to only allow compressor working fluid vapor to flow into compressor side 130b of upper piston chamber 130. An upper outlet valve 242 is in fluid communication with an upper outlet passageway 244. Upper outlet valve 242 is configured to only allow compressor working fluid vapor to flow out of compressor side 130b of upper piston chamber 130. A lower inlet valve 246 is in fluid communication with a lower inlet passageway 248. Lower inlet valve 246 is configured to only allow compressor working fluid vapor to flow into compressor side 132b of lower piston chamber 132. A lower outlet valve 250 is in fluid communication with a lower outlet passageway 252. Lower outlet valve 250 is configured to only allow compressor working fluid vapor to flow out of compressor side 132b of lower piston chamber 132. Although the arrangement described herein and depicted in FIG. 3 contemplates the use of a single one-way inlet valve and a single one-way outlet valve for each of the upper piston chamber 130 and the lower piston chamber 132, it should also be appreciated that more valves may be provided on each side to facilitate even flow distribution into and out of compressor sides 130b and 132b. For example, each valve depicted in FIG. 3 may be provided with an opposed corresponding valve oriented in the opposite direction, thereby providing two inlet and two outlet valves per compressor chamber.

Figures 5A, 5B:
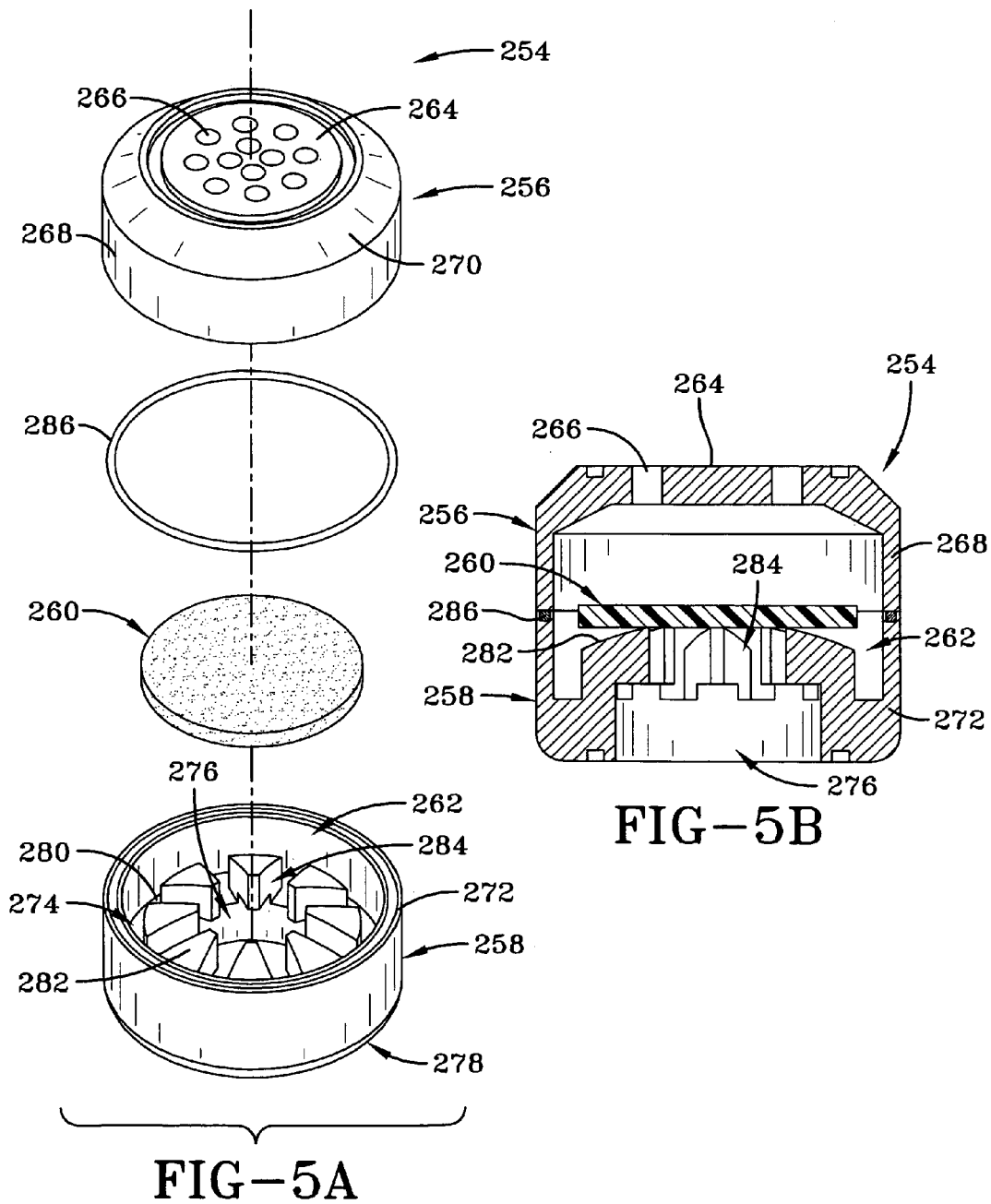
FIG. 5A is an exploded perspective view of a one-way valve according to one or more concepts of the present invention.
FIG. 5B is a sectional view of the one-way valve of FIG. 5A in an assembled state showing the floating disc in an open position.

While any one-way valve known in the art may be employed within valve assembly 138, a particularly effective one-way valve is depicted in FIGS. 5A and 5B, and is generally referred to by the numeral 254. One-way valve 254 includes an inlet side 256, an outlet side 258, and a floating disc 260 positioned within an inner cavity 262 defined by inlet side 256 and outlet side 258. Inlet side 256 includes a generally planar end wall 264 having a plurality of apertures 266 therethrough. Apertures 266 are positioned in a central diameter of end wall 264. An annular sidewall 268 extends from end wall 264 acting to partially define inner cavity 262. An annular beveled surface 270 is provided at the intersection of sidewall 268 and end surface 264 both on the exterior and within inner cavity 262. Beveled surface 270 circumferentially surrounds the central diameter containing apertures 266.

Outlet side 258 includes an annular sidewall 272 having the same diameter as sidewall 268. Outlet side sidewall 272 includes an inwardly projecting flange 274 at one end defining a bore 276. Flange 274 creates an annular end surface 278 around bore 276, and an annular inner surface 280 opposite end surface 278. A plurality of ribs 282 extend inwardly from inner surface 280 of flange 274 and are displaced therefrom in a direction opposite end surface 278. Ribs 282 are circumferentially spaced and extend radially only partially into bore 276, thereby defining an inner bore 284. Inlet side 256 and outlet side 258 are placed together with sidewalls 268 and 272 aligned and floating disc 260 positioned therein to create a one way valve 254. An annular seal 286 is provided between inlet side 256 and outlet side 258.

As will be apparent to those skilled in the art, fluid is permitted to flow in through apertures 266, thereby forcing floating disc 260 downward until in contacts ribs 282. As a result of the shape, spacing, and displacement of ribs 282 from inner surface 280, and due to a smaller diameter of floating disc 260 compared to that of annular sidewall 272, fluid is permitted to flow around floating disc 260 and between ribs 282, thereby passing in a first direction through one-way valve 254. However, when fluid flows in the opposite direction through bore 276, floating disc 260 is forced into contact with the interior surface of end wall 264 containing apertures 266. Floating disc 260 is centered over apertures 266 by beveled surface 270 and is forced by the pressure of the fluid against the inner surface of end wall 264 to block fluid flow through the valve. Floating disc 260 is preferably made from a flexible and resilient material to allow it to flex, thereby providing an improved seal against end wall 264.

With reference again to FIG. 3, as piston 15 is driven upward within heat engine 14 by high pressure working fluid vapor entering power side 132a of lower piston chamber 132, compressor working fluid vapor is compressed and forced out of compressor side 132b through lower one-way outlet valve 250 and lower outlet passageway 252. Compressor working fluid vapor is simultaneously being drawn into compressor side 130b of upper piston chamber 130 through upper inlet passageway 240 and upper inlet one-way valve 238 due to decreasing pressure within compressor side 130b of upper piston chamber 130. When piston 15 reverses direction and moves downward within heat engine 14, the flow of compressor working fluid vapor is reversed. As piston 15 moves downward due to high pressure working fluid vapor entering power side 130a of upper piston chamber 130, compressor working fluid vapor is compressed and forced out of compressor side 130b through upper one-way outlet valve 242 and upper outlet passageway 244. In this case, compressor working fluid vapor is simultaneously drawn into compressor side 132b of lower piston chamber 132 through lower inlet passageway 248 and lower inlet one-way valve 246. Thus, power section 12 drives compressor section 13 of the heat pump system 10.

In the preferred embodiment of the invention, the pressure generated within each power side 132a and 130a by the working fluid vapor during operation of the heat engine may be approximately 250 psi. A power stroke pressure of 250 psi creates a pressure in the compressor sides 132a and 130a of approximately 375 psi. This increase in pressure in the compressor sides of the chambers results from the decreased volume therein caused by piston rod 146. Thus, the heat engine provides improved efficiency over prior art designs by generating a greater compressing force in the compressor section 13 than the power force generated by the power section 12.

Whether caused by an up-stroke or down-stroke of piston 15, the compressed working fluid vapor of compressor section 13 is forced out of heat engine 14 and into condenser 180, where it is cooled while maintaining its high pressure (FIG. 1). During an up-stroke of piston 15 compressed working fluid vapor exits from lower outlet passageway 252 and travels through lower compressed vapor line 290 into condenser 180. During a down-stroke of piston 15 compressed working fluid vapor exits from upper outlet passageway 244 and travels through upper compressed vapor line 292. The compressed vapor is then cooled in condenser 180 sufficiently to change it into a liquid, while also maintaining the high pressure of the liquid, resulting in a high pressure, low temperature liquid.

The high pressure, low temperature liquid exiting condenser 180 is directed into a high pressure liquid line 294 which directs the liquid through an expansion check valve 296 to an evaporator 298, as in conventional air conditioning systems. As the low temperature, high pressure liquid passes through expansion valve 296, the pressure is decreased rapidly, resulting in a further decrease in the temperature of the liquid. The low temperature working fluid liquid absorbs heat in air circulated within evaporator 298 from the area to be cooled, resulting in a reduced temperature of the circulated air and a cooling effect. The heat absorbed by the liquid within evaporator 298 converts the working fluid back into a vapor. The working fluid vapor exits evaporator 298 through either an upper evaporator outlet line 300 in fluid communication with upper inlet passageway 240, or a lower evaporate outlet line 302 in fluid communication with a lower inlet passageway 248. In this way, the compressor section working fluid is cycled through heat engine 14, condenser 180, and evaporator 298 to continuously provide a cooling effect.

The heat pump system 10, disclosed in detail herein, is powered entirely by thermal energy. The thermal energy may be provided by a truck engine or by a hot water heater, but in either case is used to convert a power working fluid liquid into a vapor in heat generator 36. The power working fluid vapor flows through power working fluid network 65, including shifting valve 82, and is used to power piston 15 within heat engine 14. A compressor working fluid, which may be the same fluid as provided in the power working fluid network, is provided in its own separate compressor working fluid network 235. A valve assembly 138 is provided within heat engine 14 to control the flow of compressor working fluid into and out of compression chambers 130*b* and 132*b*. The reciprocating movement of piston 15 within heat engine 14 compresses the compressor working fluid, which is then directed through a condenser, an expansion valve, and an evaporator, as is known in the art, to create a cooling effect. The heat pump system 10 provides improved efficiency over prior art designs due to the greater compression forces created in compression sides 130*b* and 132*b* as compared to the power forces generated in power sides 130*a* and 132*a*. Thus, less energy is needed to create a desired compression force, thereby improving efficiency and reducing the energy load of the system.

While one preferred embodiment of the heat pump system is disclosed in detail herein, it should be appreciated that heat pump systems having alternative configurations are contemplated. For instance, one alternative heat pump system configuration contemplated utilizes the high pressure exhaust vapor from power side 130*a* of upper piston chamber 130 and power side 132*a* of lower piston chamber 132 to partially power the subsequent piston stroke in the opposite direction. In such a configuration the high pressure vapor is first directed to the opposite piston chamber before being directed through the recuperative unit 166 and into the condenser 170. The high pressure vapor exiting either power side of the heat engine retains a relatively high pressure, and may be used to power a first portion of the piston stroke in the opposite direction in order to reduce the necessary work by the heat generator.

In this alternative arrangement, alternator motor 88 may be a scroll expander powered by the exhaust vapor from heat engine 14. The scroll expander is powered by the high pressure vapor, as is well known in the art. Thus, the high pressure vapor exiting from piston chambers 130 and 132 passes first through the scroll expander, then into the opposite piston chamber to power the first portion of the piston stroke. Once a predetermined pressure has been reached within the power side of the piston chamber, the exhaust vapor is then redirected to recuperative unit 166, and high pressure vapor from shifting valve 82 is provided to the power side 130*a*, 132*a* of the heat engine to complete the piston stroke. Such a configuration may result in an efficiency gain of approximately 40% as compared with a heat pump system as described above where the piston stroke is powered entirely by high pressure vapor from the shifting valve 82. Additionally, this alternative configuration may employ a scroll pump as condensate pump 172 to draw condensed working fluid liquid from condenser 170 and back to recuperative unit 166, as discussed herein.

While the heat pump system 10 described herein and depicted in the drawings is configured to provide a cooling effect, it should be appreciated that the system could be easily modified to provide a heating effect without significant changes or additional components. In a heating operation mode, the compressor section 13 operates in the same manner, using heat engine 14 to compress a working fluid vapor. However, the high pressure, low temperature working fluid vapor exiting heat engine 14 would be directed first to evaporator 298 where it is condensed, giving up the latent heat of condensation to the air from the area to be heated. The condensed working fluid liquid would then exit evaporator 298 through expansion check valve 296 and enter condenser 180. In condenser 180 the liquid working fluid is converted into gas by absorbing the required heat of vaporization from the ambient air and the rejected heat from condenser 180. Alternatively, heat pump system 10 may be utilized solely to provide a cooling effect, and heat generator 16 may be employed to provide a heating effect when desired.

It is also contemplated that the present invention may be applicable to refrigeration trailers to effect cooling therein. Such trailers are typically used to transport produce or other perishable goods that must remain chilled throughout the journey from a manufacturer to the retailer. Where applied to refrigeration trailers, the heat pump system may be permanently mounted to the refrigeration trailer and connected to the pressure side of the engine hot water pump by a hose. After cycling through the heat pump system, the semi-cooled water returns to the intake side of the engine hot water pump. If it becomes necessary to remove the trailer, or turn off the truck engine, a hot water heater unit is provided as a part of the system to continue to provide the thermal energy necessary to operate the heat engine, as discussed in detail herein.

Preferably, two units are provided in tandem to provide the cooling effect necessary to maintain the low temperature of the trailer. The tandem heat pump systems operate substantially as discussed above, except that the compressor section high pressure working fluid vapor exiting the heat engines is directed to a single condenser and evaporator. After passing through the common condenser and evaporator, the compressor section working fluid vapor is returned to each heat engine to be recycled through the system. The tandem heat pumps are preferably arranged in a parallel configuration and are provided with shut-off valves. Such an arrangement allows for operation of a single heat pump system when desired or when necessary.

It is also contemplated that the heat pump system disclosed herein may be adapted for a variety of additional uses such as, for example, for heating swimming pools or other contained water, for providing a cooling effect, a heating effect, or both to an RV or other vehicle, or for use with small outbuildings or camp structures. In addition, the system may incorporate one or several additional solar panels at appropriate locations, as would be apparent to those skilled in the art, to further reduce the fuel and energy required to operate the system or by utilizing solar energy.

It is thus evident that a heat pump system constructed as described herein accomplishes the objects of the present invention and otherwise substantially improves the art.

What is claimed is:

1. A heat engine comprising a body defining a heat engine chamber, a valve assembly including a valve assembly body, a bore through said valve assembly body, a piston slidably received within said heat engine chamber, said piston having a piston rod slidably received in said bore of said valve assembly, said valve assembly and said piston rod acting to divide said heat engine chamber into a first chamber and a second chamber, each said first and second chamber including a wall, said valve assembly including a one-way inlet valve and a one-way outlet valve each in fluid communication with said first chamber and a compressor working fluid network, said piston including a first piston head slidably received in said first chamber and a second piston head slidably received in said second chamber, such that said first piston divides said first chamber into a power side and a compressor side, and second piston divides said second chamber into a power side and a compressor side, said first and second piston heads connected by said piston rod, a first shifting port positioned in said wall of said first chamber and fluidly coupled to said power side of said first chamber, and a second shifting port positioned in said wall of said second chamber and fluidly coupled to said power side of said second chamber, such that said first and second shifting ports are selectively blocked and unblocked by said respective first and second piston heads, and a shifting valve fluidly coupled to each said shifting port, wherein said shifting valve is selectively moved between a first position and a second position by power working fluid vapor delivered from either of said first and second shifting ports based upon the position of said first and second piston heads relative to said shifting ports, such that when said shifting valve is in said first position, said piston is moved in a first direction causing compressor working fluid to be drawn into said power side of said first chamber, and when said shifting valve is in said second position, said piston is moved in a second direction opposite to said first direction, causing compressor working fluid to be compressed and forced out of said compressor side of said first chamber.

2. The heat engine of claim 1, said working fluid network including a condenser and an evaporator, said condenser being in fluid communication with said one-way outlet valve, and said evaporator being in fluid communication with said one-way inlet valve.

3. The heat engine of claim 1, further comprising a two-way port in fluid communication with said power side of said first chamber, a two-way port in fluid communication with said power side of said second chamber, and a power working fluid vapor source, said two-way ports and said power working fluid vapor source being in fluid communication with said shifting valve to selectively power said piston in said first direction and said second direction.

4. The heat engine of claim 1, wherein, said shifting valve includes a valve body, an internal bore having a first end and a second end, such that said first end is fluidly coupled to said first shifting port and said second end is fluidly coupled with said second shifting port, a plurality of fluid passageways and channels within said valve body, and a shifting block slideably disposed within said internal bore, said shifting block having a first annular recess and a second annular recess, said shifting valve being selectively and alternately operable to provide power working fluid vapor to said power side of said first chamber when said shifting block is in a first position and to said power side of said second chamber when said shifting block is in a second position due to the alignment of said first and second annular recesses with more than one of said channels.

5. The heat engine of claim 1, further comprising a condensate pump having a pump housing, a first cavity within said housing, a second cavity within said housing, a first piston slidably received in said first cavity, a second piston slidably received in said second cavity, a rotating drive shaft extending generally perpendicular to said first and second pistons, and a bearing mounted eccentrically on said rotating drive shaft, wherein said first and second pistons are biased to remain in contact with said bearing, thereby generating a reciprocating motion of said first and second pistons within said first and second cavities.

6. The heat engine of claim 1, wherein said one-way valves include an inlet side with a plurality of apertures, an outlet side with a bore therethrough, an inner cavity defined by said inlet side and said outlet side, at least one projection extending into said inner cavity adjacent to said bore, and a floating disc, wherein fluid is permitted to flow in through said inlet side by forcing said floating disc away from said apertures and against said at least one projection which prevents said floating disc from sealing against said bore, and wherein fluid is prevented from flowing out through said inlet side by forcing said floating disc against said apertures.

7. The heat engine of claim 1, wherein said first chamber and said second chamber have a height dimension measured along a longitudinal axis of the heat engine, such that said first piston head has a height dimension that is at least half said height dimension of said first chamber, and said second piston head has a height dimension that is at least half of said height dimension of said second chamber.

* * * * *